United States Patent

[11] 3,595,342

| [72] | Inventor | Paul C. O'Leary<br>2668 Stanford Lane, Salt Lake City, Utah 84117 |
|---|---|---|
| [21] | Appl. No. | 866,786 |
| [22] | Filed | Sept. 16, 1969 |
| [45] | Patented | July 27, 1971 |

[54] OILER SYSTEM AND DEVICE
5 Claims, 2 Drawing Figs.

[52] U.S. Cl. .................................. 184/56 A, 261/78 A
[51] Int. Cl. ..................................... F16n 7/34
[50] Field of Search ........................ 184/55, 55 A, 56, 56 A; 261/78.1

[56] References Cited
UNITED STATES PATENTS

| 1,984,422 | 12/1934 | Nell | 184/55 |
| 2,897,919 | 8/1959 | Dellner | 184/55 |
| 3,040,835 | 6/1962 | Ahnert | 184/55 |
| 3,135,356 | 6/1964 | Pohs | 184/55 |

FOREIGN PATENTS

| 1,195,540 | 5/1959 | France | 184/55 |
| 868,472 | 5/1961 | Great Britain | 184/55 |

*Primary Examiner*—Manuel A. Antonakas
*Attorney*—M. Ralph Shaffer

ABSTRACT: The subject comprises an oiler system and device usable with a compressed air supply for providing lubricant-entraining compressed air to an air tool. The same avoids pressuring the oil tank or reservoir of the system and, instead, provides a compressed-air actuated, piston-type pump for sucking in oil from a reservoir into a variable-volume lubricant chamber during periods of absence of applied air pressure and then, during periods of applied air pressure forcing lubricant from the chamber into an oil injector, having a variable, presettable outlet orifice, which is disposed in the compressed air stream leading to the connected air tool. Check valve means is incorporated such that the pressured oil or lubricant is not returned to the reservoir or tank connected to the device during pressure strokes of the piston.

PATENTED JUL 27 1971 3,595,342

INVENTOR.
PAUL C. O'LEARY
BY
HIS ATTORNEY

OILER SYSTEM AND DEVICE

The present invention relates to oiler systems for incorporation with the air pressure line leading to an air-driven tool and, more particularly, provides a new and improved system and device incorporating the same wherein lubricant maintained within an oil chamber in the device is placed under pressure only when a control valve, to be connected thereto and designed to actuate the air tool, is opened. In this way, oil is expelled into the line only when an air stream is present therein. Thus, the necessity of pressuring the basic supply of oil or lubricant to which the device is to be connected is avoided.

In the past a number of different types of oilers have been used in air pressure systems for driving air tools such as rock drills, hand drills, impact wrenches, and other types of air-operated equipment. It is conventional is some prior systems to maintain a reservoir such as an oil tank under pressure, this so that oil lubricant contained therein, since the same is always disposed under pressure, will be immediately available for pressured injection into an air stream leading to the tool to be driven by the compressed air. This type of system is somewhat unsatisfactory in many respects, among which is the problem of the necessity of exhausting the air within the tank in order to fill the same. Also, there is present the evident danger of maintaining under pressure a large reservoir. Other systems include a venturi, and rely upon the negative pressure produced thereby in drawing lubricant into the air stream. These venturi systems comprising oilers, as such devices are commonly called, operate somewhat less than satisfactorily in that there is a leakage present even in the absence of air pressure; further, variations in the air pressure markly effect the operation of the venturi so that reduction in air pressure results in insufficient oil being supplied the air tool. Additionally, there is a further problem of accurately designing and machining the venturi so that the precise amount of necessary lubricating oil is injected into the air stream when the latter is turned on.

Accordingly, a principal object of the present invention is to provide a new and improved oiler system and device for air tools.

A further object is to provide a new and improved oiler device for operating air tools in conjunction with a compressed air system.

An additional object is to provide an oiler system and device wherein air pressure is used not only to provide the stream of air leading to the tool but also to pressure the oil in a self-contained oil chamber within the device such that the same may be properly injected into the air stream.

An additional object is to provide an oiler device having a single stroke pump, actuatable by air pressure when the latter is turned on, so that the latter progressively and continuously injects lubricating oil into the pressured air stream.

A further object is to provide an oiler having an air pressure actuated cylinder and a check valve system so that when air pressure is turned on and applied to the piston of the device, the same will operate to reduce the volume of the oil chamber and, hence, expel oil therefrom into the air stream, and this in such a manner that the pressured lubricating fluid within the device is not transmitted back to a basic tank or a reservoir connected to the device.

An additional object is to provide a presettable metering adjustment in an oiler device metered so that lubricating oil may be injected into an air stream for any given air pressure.

An additional object is to provide an oiler device having its own oil chamber of variable volume disposed within an air stream passageway of the device, the same being constructed such as a piston disposed within such air stream is operable to alter the volume of the above mentioned oil chamber and, thereby, to suck in oil from a main reservoir and, subsequently, expel oil out of the chamber into an injection nozzle disposed within the air stream.

In the present invention the system includes an air stream outer housing to which a source of pressured air is connected and through which the air passes to a hose leading to the attached air tool. Disposed centrally within this housing is a piston-cylinder combination, these being so disposed that the air pressure operates to translate the piston in the direction of air flow so as to tend to reduce the volume of an oil chamber intimately associated with the piston. Such reduction in volume, of course, causes a pressure to be applied to lubricating oil contained therein and an actual expression thereof into an injection nozzle, so that the oil may be injected into the air stream. A double check valve construction is provided so as to avoid leakage of oil into the nozzle in the absence of the application of air pressure and, in the presence of such air pressure, to preclude oil within the oil chamber from being forced back to its reservoir. The reservoir to which the device is connected is hence relieved of the requirement of any pressure being present thereat to force oil through the device into the injection nozzle thereof.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

Figure 1:
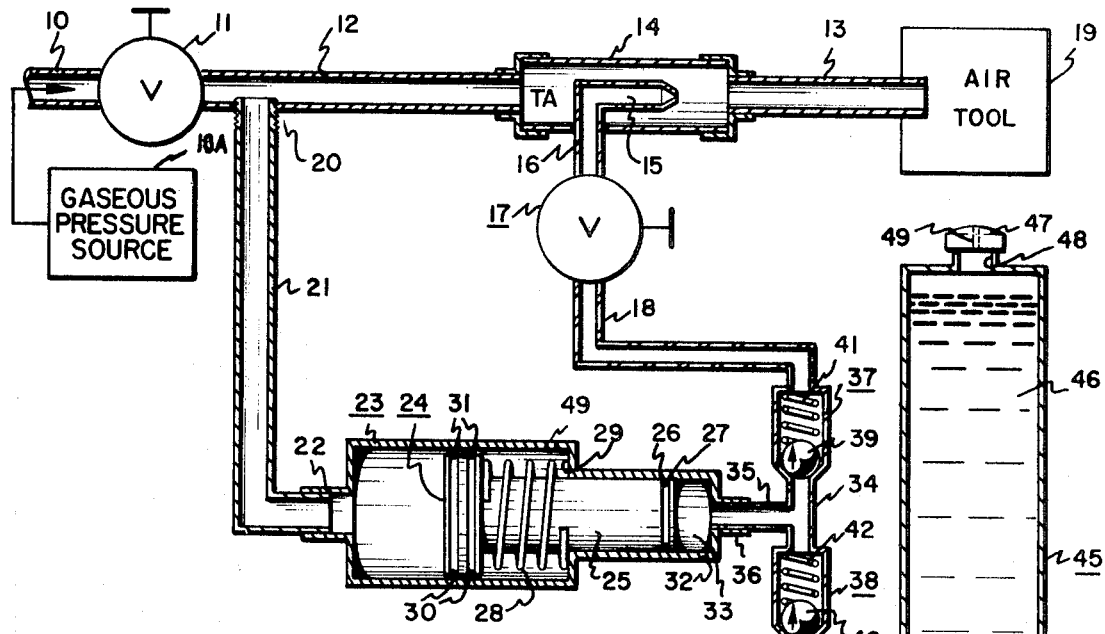
FIG. 1 is a fragmentary schematic diagram of the system incorporating the features of the present invention.

FIG. 1 illustrates schematically the system approach taken by the present invention. Conduit 10 is constructed for coupling to a compressed air supply 10A proceeding in the direction of the arrow shown to valve 11. Valve 11 is normally a manually operable control valve of conventional design and actuates, when open, air tool 19. Leading from valve 11 is conduit 12, the same being coupled to conduit 13 through a mixing chamber 14 in which injected lubricating fluid such as injected oil proceeds from nozzle 15 into chamber 14. The mixing chamber 14 is shown to include a threaded aperture TA in which is threaded conduit 16 leading to valve 17. Valve 17 will comprise a manually operable throttle valve preferably taking the form of a needle valve, this to provide a metered flow of oil proceeding from conduit 18 through the valve 17 to conduit 16, thereby to be routed into and injected out of the nozzle 15.

Conduit 13 is coupled to air tool 19 in the usual manner. This air tool may comprise a pneumatic drill, air hammer, rock drill, or other piece of pneumatically operated equipment.

Aperture 20 of conduit 12 receives conduit 21 and the latter is routed for connection to fitting 22 of cylinder 23. Piston 24 is operably disposed in cylinder 23. The same includes a piston rod 25 provided with O-ring groove 26, the latter having conventional, sealing O-ring 27 disposed therein. Return spring 28 is disposed between the right side of face of piston 24 and abutment 29. Grooves 30 in the piston 24 accommodate O-ring seals 31 in the manner indicated. Integrally or otherwise formed the cylinder 23 is a guide cylinder 32, the latter serving to guide a piston rod 25 back and forth in the manner shown. The guide cylinder 32 thus includes an oil chamber 33 of variable displacement volume in accordance with various positionings of piston 24 within cylinder 23.

A hydraulic tee fitting 34 is provided and the base leg 35 of which is threaded or otherwise secured to port 36. Opposite extremities of the tee 34 are coupled to check valves 37 and 38, the latter including the usual ball valves 39 and 40 which are backed by spring 41 and 43 in the usual manner. The check valves, of course, may take any desired form. The direction of flow through the valves is in the manner indicated by the arrows contained therein.

Conduit 43 is interconnected between check valve 38 and outlet port 44 of oil reservoir 45. Reservoir 45 is filled with oil or other desired lubricating fluid 46 and includes the usual filler cap 47 for convenience of filling the same. The latter, of course, is fittingly disposed over intake neck 48.

In operation, the valve 11 comprises the control or actuating valve for air tool 19. Thus, when valve 11 is turned off, no air pressure will exist in conduit 12 or conduit 21. Hence, the compressed air supplied to the air tool 19 is turned off so that the tool is inert; also, pressure is absent the left-hand side of piston 24. This enables piston 24 to return within cylinder 23 to a position to the left under the action of return spring 28. A vent 49 may be provided in reservoir 45, and vent 49' is provided cylinder 23. In any event, a return of piston 24 to leftward position in cylinder 23 produces an area of reduced pressure at 33 in FIG. 1. Spring 42 will be a preselected light spring such that the reduced pressure area is sufficient to allow fluid 46 from reservoir 45 to proceed through conduit 43 and through check valve 38 into the oil chamber 33. The spring 41 of check valve 37 may be chosen to be a heavier spring such that oil will proceed therethrough in an upwardly direction according to the arrow shown, only when air pressure is exerted on the left-hand side of piston 24. When such does occur, as via the opening of valve 11, then the air forces the piston 24 to the right, thereby forcing the oil out of chamber 33 and into tee 34 and, therefrom, through the valve 37 and the throttling or metering valve 17 into injection nozzle 15 within mixing chamber 14. The oil introduced at this point will be in an atomized or semiatomized state and carrier or entrained by the pressured air through the air hose or conduit 13 to air tool 19. Turning off of the valve 11 will enable the oil chamber to enlarge by virtue of the movement of piston 24 to the left, thereby permitting the oil chamber 33 to refill the fluid from the oil tank or reservoir 46.

It is to be noted that this operation has occurred without the employment of any air pressure whatsoever within the oil tank or reservoir 46. Rather, pressure is exerted within the system in that, with the employment of check valves 37 and 38 in the manner shown, oil under pressure is introduced into the nozzle only when valve 11 has been opened and the metering or throttle valve 17 adjusted for appropriate oil injection in nozzle 14.

Preferably, the valve 17 will be simply an adjustment device which is once set and then left to remain in its preset condition. Hence, actuation of valve 11 will not only pass air to the air tool 19 but also cause sufficient oil to be entrained within the air stream so that parts within air tool 19 are sufficiently lubricated in a desired manner.

Figure 2:
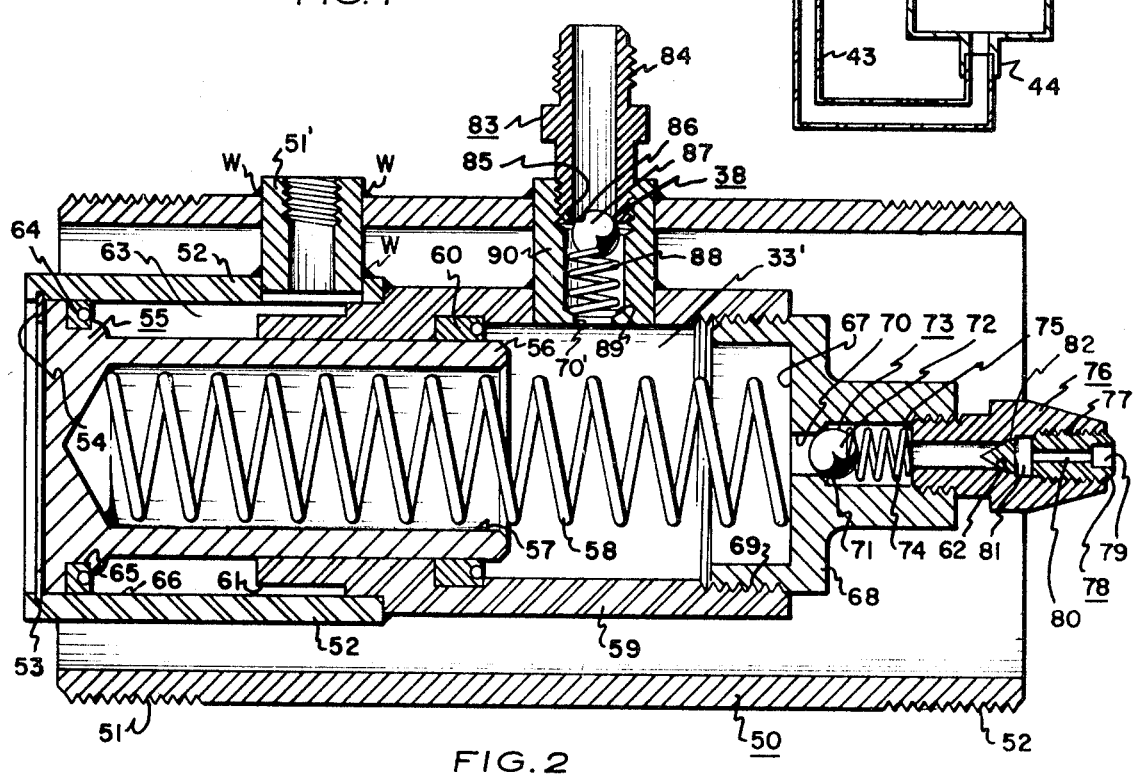
FIG. 2 is a vertical, longitudinal cross section of the oiler device of the present invention incorporating the system thereof.

FIG. 2 illustrates a practical physical embodiment of the system of FIG. 1 and includes all portions thereof excepting the air tool and reservoir. In FIG. 2 outer housing 50 is threaded at its opposite ends 51 and 52, the former end being constructed for connection to a source of compressed air provided with valve 11 in FIG. 1, and the latter constructed for connection to a hose such as conduit 13 leading to air tool 19. A vent-port stub cylinder 51' is welded to the outer housing 50 at W and is also welded to a main cylinder 52 as indicated. The main cylinder includes a retainer groove 53 which is provided with retainer 54. The latter serves as a stop abutment for piston 55. Piston 55 includes an outwardly extending piston rod extension 56 having an inner surface 57, the latter providing a spring guide for the piston return spring 58 of the construction. Auxiliary cylinder 59 is welded to the main cylinder 52 in the manner illustrated and includes a usual seal 60 such as a Teflon seal having an O-ring insert. Auxiliary cylinder 59 may be turned down at 61 so as to provide access through the vent-port cylinder 51' to peripheral area 63. Seal 64 is inserted in a groove 65 in the piston to provide a seal between the inner wall 66 of the main cylinder 52 and the piston. Return spring 58 may be designed to abut directly against surface 67 of a flange head 68. The latter is threaded at 69 into the right end of auxiliary cylinder 59. Outlet port 70 terminates in a seat 71 provided for outlet check valve ball 72 of outlet check valve 73. The latter includes a ball spring 74 in the usual manner, and the latter abuts against the end 75 of nozzle 76. Nozzle 76 includes a threaded orifice 77 receiving a needle valve 78 that can be adjusted as by the insertion of a key or other means in slot opening 79. Needle valve 78 includes a central aperture 80 which takes the form of a bore having a cross or through aperture 81. The needle valve will seat against a seat 82 of nozzle 76, when the valve is turned outwardly, progressively increasing amounts of fluid may be passed through orifice 82, around the needle valve tip 62, through cross orifice 81, and finally into and out of orifice 80.

In operation, the structure of FIG. 2 illustrates that the outer housing 50 may correspond with members 12, 13, and 14 in FIG. 1. Accordingly, the valve 11 of FIG. 1, now shown in FIG. 2, may comprise a conventional air tool control valve and be coupled to a conduit or hose 10 leading to an air pressure supply. The valve 11, hence, will be directly connected to portion 51 of outer housing 50 in FIG. 2. The portion 52 will be directly connected to the hose of an air tool 19 of FIG. 1. The connection at 44 in FIG. 1 corresponds to the inclusion of union 83 in FIG. 2. The same includes inlet port 84 and connector end 85. Connector end 85 provides a valve seat 86 against which ball 87 seats. The latter is backed by a ball spring 88 in the usual manner. Valve 87 seats against seat 89 of inlet port 70' of cylindrical member 90. The latter is welded to the auxiliary cylinder 59 and to the outer housing 50. Accordingly, the union 83 may correspond to fitting 44 and conduit 43 in FIG. 1, with the valve 38 in FIG. 1 being indicated as such, i.e. 38, in FIG. 2. This check valve, hence, admits oil into cavity 33' in FIG. 2, corresponding to cavity 33 in FIG. 1. It will be noted that the oil chamber or cavity 33' may in fact include the piston return spring 58 as seen in FIG. 2, instead of the piston return spring 28 in FIG. 1. Accordingly, area 33' in FIG. 2 comprises an oil chamber of variable volume. The volume, of course, will vary with the particular disposition of piston 55. The volume is greatest when the piston is at its extreme leftward position in which event the compressed air supply will have been turned off relative to the piston surface tee in FIG. 2. The application of pressure is, of course, accomplished by the turning on of a shut-off valve connected to end 51, thus causing piston 55 to proceed to the right, thus compressing the piston return spring 58 in FIG. 2 and reducing the oil chamber volume. This operates to supply pressure to the oil contained therein so that the same will actuate the outlet check valve 73, corresponding to check valve 37 in FIG. 1, so as to expel oil out of nozzle 82 via needle valve 78. The needle valve, of course, may be preadjusted in accordance with pressure in the air line, so that a proper amount of oil is introduced into the air stream proceeding through outer housing 50 proximate its interior surface.

It is to be observed that oil flows only when air pressure is applied the left face of piston 55 as by the opening of valve 11 in FIG. 1. When the air pressure does not appear at the piston, then the oil is turned off by virtue of the action of outlet check valve 73 in FIG. 2. Note is to be made that pressure is applied to oil or other fluid within chamber 33' in FIG. 2 only when air pressure is present. And, whether or not air pressure is present as by the opening of valve 11, air pressure is at no time required within reservoir 45 in FIG. 1 so as to pressure the oil or other fluid out of outlet port 44 in FIG. 1.

The vent port cylinder 51 offers an ideal way of venting air out of chamber 63 during successive air pressure actuation of the piston 55. It is seen, therefore, that the oiler and oiling system of the present invention may be incorporated in a single compact unit which does not require any pressured oil system supply. Rather, pressure is supplied the intermediate oil chamber within the oiler tool only when compressed air is applied thereto as by the actuation of an air tool's control valve or a shut-off valve. When the valve is closed, however, air pressure is withdrawn from an operating piston so that the oil chamber in the oiler device will automatically refill through check valve 38, this by virtue of the reduced pressure in chamber 33' owing to the leftward movement of piston 55.

In no event is air or other pressure necessary within the oil tank or reservoir of the system.

The operation of the system and oiler device incorporating the same may be briefly summarized as follows. When the external control valve 11 of FIG. 1 for air tool 19 is closed, then no air flows and the tool automatically exhausts the air line between itself and the oiler to atmosphere. When the valve is opened, then the air tool 19 of FIG. 1 is operated and sufficient lubricating oil is entrained into the air stream by the oiler device of the invention so that the air tool is not only suitably air powered but also lubricated. It is most important to note that in the present system the control valve may be either proximate the air tool or remotely disposed on a control panel, for example. In certain types of applications as in the case of the use of rock drills in mines, the air tool will be driven a more or less standard, given length of time. Thus, one is not required to supply oil to an air tool continuously over a long length of time, i.e. 8 to 24 hours per operation period. Rather, there is merely needed or required a sufficient supply of oil to operate the tool for a relatively short time, i.e. 10 minutes, for example. Therefore, the lubricating system of the invention can be remotely controlled where the oil chamber 33' and related parts are constructed to supply oil to an air stream for a period of, say, ten minutes. When the period of operation of the air tool is ended, as by the turning off of valve 11 in FIG. 1, then the system exhausts itself as to air through the air tool and the oiler device recharges itself with lubricant as by piston return spring 58. The action of the piston in proceeding to the left and the action of return spring 58 causes lubricating oil to be sucked into the oil chamber 33'. It is noted that the oiler may likewise be employed in a direct manual system wherein a valve 11 forms a portion of the air tool or is otherwise intimately associated therewith. In such event periodic actuations can be had, with "rests" therebetween admitting automatic recharging of the tool with lubricating oil via chamber 33'.

While particular embodiments of the present invention have been shown and described, it will be obvious to those skilled in the art that changes and modifications may be made without departing from this invention in its broader aspects.

I claim:

1. A continuous flow oiler system including, in combination, inlet means for coupling to a supply of compressed, gaseous, power media; outlet means for coupling to a work tool to be powered by said media; control valve means having an inlet coupled to said inlet means and also an outlet; mixing chamber means intercoupled between said outlet of said control valve means and said outlet means; variable-volume lubricant chamber means having an inlet port and an outlet port; piston means independent of said control valve for progressively reducing the volume of said chamber means when said valve means is open; means coupled to said outlet of said control valve means and responsive to media pressure thereat for advancing said piston means to so reduce the volume of said chamber means; means for returning said piston means when said valve means is closed to expand the volume of said chamber means; first means for coupling said inlet port to a source of lubricating fluid; an injection nozzle communicating with said mixing chamber, and second means for coupling said outlet port to said injection nozzle.

2. The system of claim 1 wherein said piston means includes a piston rod, said lubricant chamber means comprising hollow cylinder means operably receiving said piston rod and being defined in part thereby.

3. A continuous flow oiler device including, in combination, an outer cylindrical housing having one end constructed for coupling to a valved gaseous pressure source and a second end constructed for coupling to gaseous-pressured operated work tool; a lubricant injection nozzle disposed in said outer cylindrical housing and facing downstream; structure disposed within said outer cylindrical housing and defining a variable-volume lubricant chamber; piston mean disposed within said outer cylindrical housing, facing upstream, and in part defining said lubricant chamber to vary the volume thereof; one-way inflow inlet means affixed to said outer cylindrical housing and to said structure and communicating with the interior thereof, for fixedly spacing said structure coaxially within said outer cylindrical housing in spaced relationship with respect thereto and also for introducing fluid lubricant within said structure, the spacing between said structure and said outer cylindrical housing defining an annular gaseous-flow passageway extending throughout the length of said outer cylindrical housing one-way outflow outlet means connected to said structure, communicating with the interior thereof, and connected to said nozzle; and return spring means for returning said piston means upstream in the absence of gaseous pressure applied thereto.

4. A continuous flow oiler device including, in combination, an outer cylindrical housing having one end constructed for threaded coupling to a gaseous pressure operated work tool; a lubricant injection nozzle disposed in said outer cylindrical housing facing downstream, a cylinder disposed within and mounted in annularly spaced relationship with respect to said outer cylindrical housing throughout the length thereof; structure disposed in said outer cylindrical housing and defining a variable-volume lubricant chamber; piston means operably disposed in said cylinder and having a hollow piston rod extension passing into and communicating with the interior of said structure, said piston means in part defining said lubricant chamber to vary the volume thereof; one-way inflow inlet means connected to said structure ad communicating with the interior thereof, said inlet means being constructed for connection to an external lubricant reservoir; one-way outflow outlet means connected to said structure, communicating with the interior thereof, and connected to said nozzle; and return spring means disposed within said structure and engaging said piston means interior of said piston rod.

5. Structure according to claim 4 wherein said device includes venting means fixedly connected to said outer cylindrical housing and mountingly engaging said cylinder to mount the same in place and to communicate with the interior thereof forwardly of said piston means.